(12) United States Patent
He et al.

(10) Patent No.: US 12,126,226 B2
(45) Date of Patent: Oct. 22, 2024

(54) MOTOR CONTROLLER FOR A TOOL

(71) Applicant: Snap-on Incorporated, Kenosha, WI (US)

(72) Inventors: Haolun He, Kunshan (CN); Yongbin Xia, Kunshan (CN); Charles R. Frontczak, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 539 days.

(21) Appl. No.: 17/524,029

(22) Filed: Nov. 11, 2021

(65) Prior Publication Data
US 2023/0147745 A1    May 11, 2023

(51) Int. Cl.
| | |
|---|---|
| H02K 11/33 | (2016.01) |
| B25F 5/00 | (2006.01) |
| H02K 7/116 | (2006.01) |
| H02K 7/14 | (2006.01) |
| H02K 11/21 | (2016.01) |
| H02K 11/215 | (2016.01) |
| H02K 29/06 | (2006.01) |
| H02K 29/08 | (2006.01) |
| H02K 9/06 | (2006.01) |

(52) U.S. Cl.
CPC .............. *H02K 11/33* (2016.01); *B25F 5/008* (2013.01); *H02K 7/116* (2013.01); *H02K 7/145* (2013.01); *H02K 11/21* (2016.01); *H02K 11/215* (2016.01); *H02K 29/06* (2013.01); *H02K 29/08* (2013.01); *H02K 9/06* (2013.01); *H02K 2211/03* (2013.01)

(58) Field of Classification Search
CPC ...... H02K 7/145; H02K 11/21; H02K 11/215; H02K 11/33; H02K 29/06; H02K 29/08; H02K 2211/03
See application file for complete search history.

(56) References Cited

U.S. PATENT DOCUMENTS

| | | |
|---|---|---|
| 6,949,849 B1 | 9/2005 | Wright et al. |
| 7,199,496 B2 | 4/2007 | Suzuki et al. |
| 9,431,881 B2 | 8/2016 | Clendenen et al. |
| 10,651,708 B2 | 5/2020 | Iwasaki |
| 10,848,042 B2 | 11/2020 | Beyerl et al. |
| 10,886,817 B2 | 1/2021 | Namuduri et al. |

(Continued)

FOREIGN PATENT DOCUMENTS

| | | |
|---|---|---|
| EP | 3503355 A1 | 6/2019 |
| EP | 3657647 A1 | 5/2020 |

(Continued)

OTHER PUBLICATIONS

Taiwan Office Action for corresponding Application No. 11220275190 dated Mar. 25, 2023, 13 pages.
Combined Search and Examination Report for corresponding United Kingdom Application No. GB2215884.4 dated Apr. 3, 2023, 8 pages.

(Continued)

*Primary Examiner* — Ramon M Barrera
(74) *Attorney, Agent, or Firm* — Taft Stettinius & Hollister LLP

(57) ABSTRACT

A motor controller for a motor having an end cap. The motor controller including a power board adapted to couple with a first surface of the end cap, on an internal side of the motor, and including opposing first and second sides and a control board adapted to couple to a second surface of the end cap, on an external side of the motor, and including a processor. The power board including position sensors disposed on the first side and switching elements disposed on the second side.

20 Claims, 3 Drawing Sheets

(56) References Cited

U.S. PATENT DOCUMENTS

| 11,114,927 B2 | 9/2021 | Beyerl et al. |
| 2014/0265748 A1 | 9/2014 | Clendenen et al. |
| 2018/0152077 A1 | 5/2018 | Ni |
| 2019/0363651 A1 | 11/2019 | Wang et al. |
| 2020/0112231 A1 | 4/2020 | Hatfield et al. |
| 2021/0234481 A1 | 7/2021 | Boulanger et al. |
| 2021/0384809 A1 | 12/2021 | Beyerl et al. |

FOREIGN PATENT DOCUMENTS

| JP | 2021065018 A | 4/2021 |
| WO | 2017168728 A1 | 10/2017 |
| WO | 2020166344 A1 | 8/2020 |
| WO | 2021033678 A1 | 2/2021 |
| WO | 2021034652 A1 | 2/2021 |

OTHER PUBLICATIONS

Examination Report No. 1 for corresponding Application No. 2022256132 dated Jun. 28, 2023, 3 pages.
United Kingdom Search Report for corresponding UK Application No. 2317183.8, dated Feb. 1, 2024, 4 pages.
Australian Examination Report No. 2 for corresponding AU Application No. 2022256132, dated Feb. 20, 2024, 3 pages.

MOTOR CONTROLLER FOR A TOOL

TECHNICAL FIELD OF THE INVENTION

The present invention relates generally to a motor controller for a power tool.

BACKGROUND OF THE INVENTION

Power tools, such as, for example, drills, screwdrivers, impact drivers, grinders, ratchet, cutters, polishers, etc., commonly include a motor powered by a rechargeable power source, such as a battery, for example. In these conventional tools, the motor is often a brushless DC electric motor (BLDC) controlled via commutation. BLDC motor commutation is typically implemented using a motor controller that includes a microcontroller or microprocessor device disposed on a printed circuit board (PCB).

Many different techniques of commutation of three-phase brushless direct current (BLDC) motors are currently used. Typically, commutation is controlled based on a position of a rotor of the motor. The position of the rotor is detected by position sensors, such as, for example, Hall-effect sensors. The microcontroller or microprocessor device then controls high and low side switches, such as, for example metal-oxide semiconductor field-effect transistors (MOSFETs), of respective phases of the motor in a particular sequence to control the motor according to a commutation scheme, such as, for example, a six-step commutation. For example, in a three-phase brushless DC motor, three position sensors are located 60 or 120 degrees apart and have six transition points (i.e., three sensors each actuating between high and low in response to the position of the rotor).

Conventional power tools use a single motor controller PCB that includes the microcontroller, switches, sensors, etc. Thus, these conventional motor controller PCBs are relatively large and require the tool housing to have sufficient room to enclose the motor controller PCB. These conventional power tools also include one or more heat sinks to dissipate heat from the motor controller PCBs, which further enlarges the space required to house these components and requires additional assembly.

SUMMARY OF THE INVENTION

The present invention relates broadly to a motor controller for a BLDC motor. The motor controller includes a control board and a power board. The power and control boards are coupled to a motor end cap and are thereby part of the motor. The power board is disposed on and coupled to an internal side or first side of the motor end cap. A thermal conductive pad is disposed between the power board and the motor end cap. The control board is disposed on and coupled to an external side or second opposing side of the motor end cap. The motor end cap is used as a heat sink to dissipate heat created by the power and control boards, thereby eliminating the need for a separate heat sink. The present invention results in less components and simpler manufacturing, compared to current designs, and is able to be used in more compact items, such as power tools.

In an embodiment, the present invention broadly comprises a power tool. The tool includes a motor disposed in the housing and adapted to receive power from a power source. The electric motor includes an end cap having opposing first and second surfaces, a power board coupled to the first surface and including opposing first and second sides, position sensors disposed on the first side, and switching elements disposed on the second side, and a control board coupled to the second surface and including a processor.

In another embodiment, the present invention broadly comprises a motor controller for a motor having an end cap. The motor controller including a power board adapted to couple with a first surface of the end cap and including opposing first and second sides and a control board adapted to couple to a second surface of the end cap and including a processor. The power board including position sensors disposed on the first side and switching elements disposed on the second side.

In another embodiment, the present invention broadly comprises a motor adapted to be powered by a power source. The motor including an end cap having opposing first and second surfaces, a power board coupled to the first surface and including opposing first and second sides, position sensors disposed on the first side, and switching elements disposed on the second side, and a control board coupled to the second surface and including a processor.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
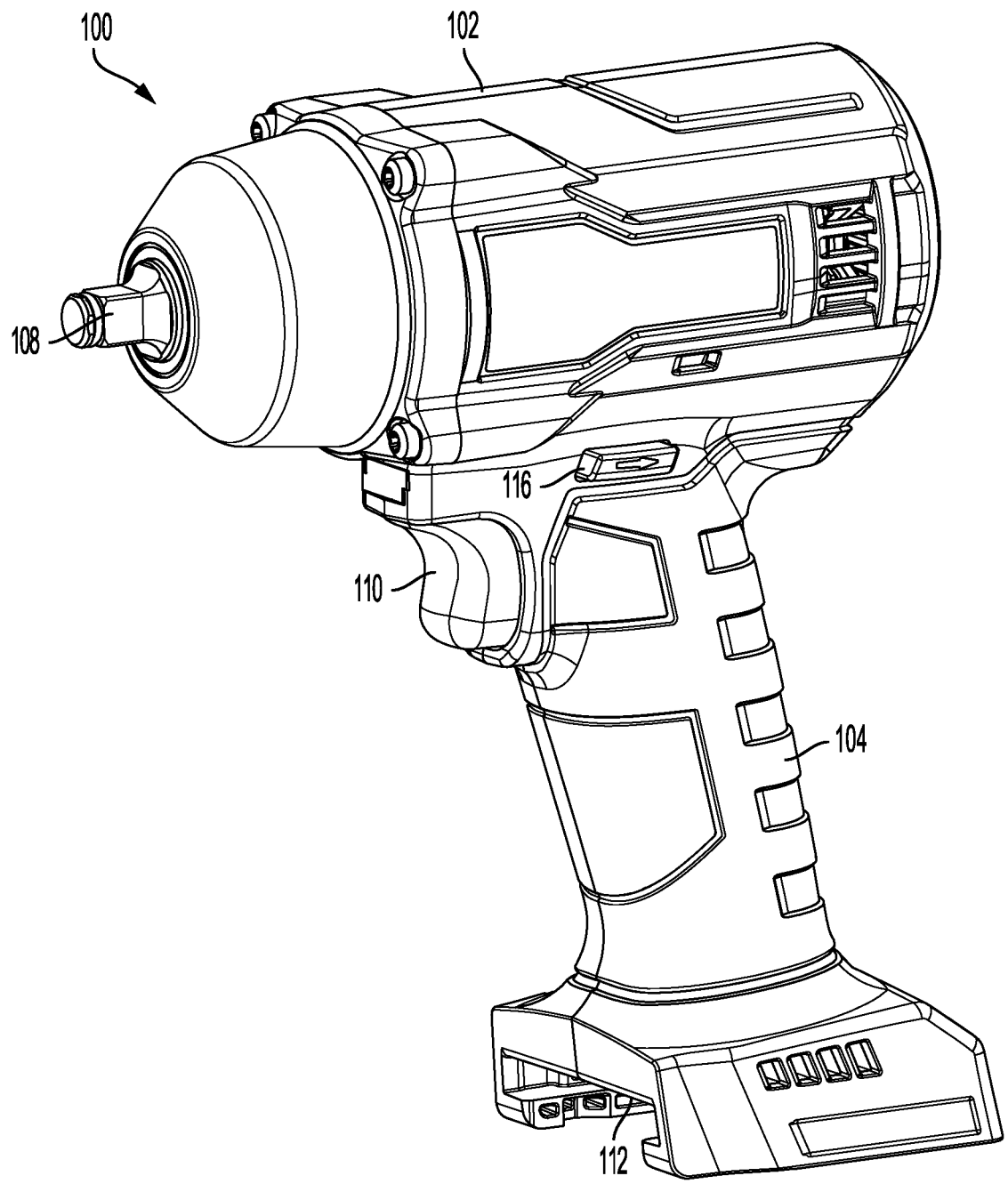
FIG. 1 is a perspective view of an exemplar tool incorporating an embodiment of the present invention.
Figure 2:
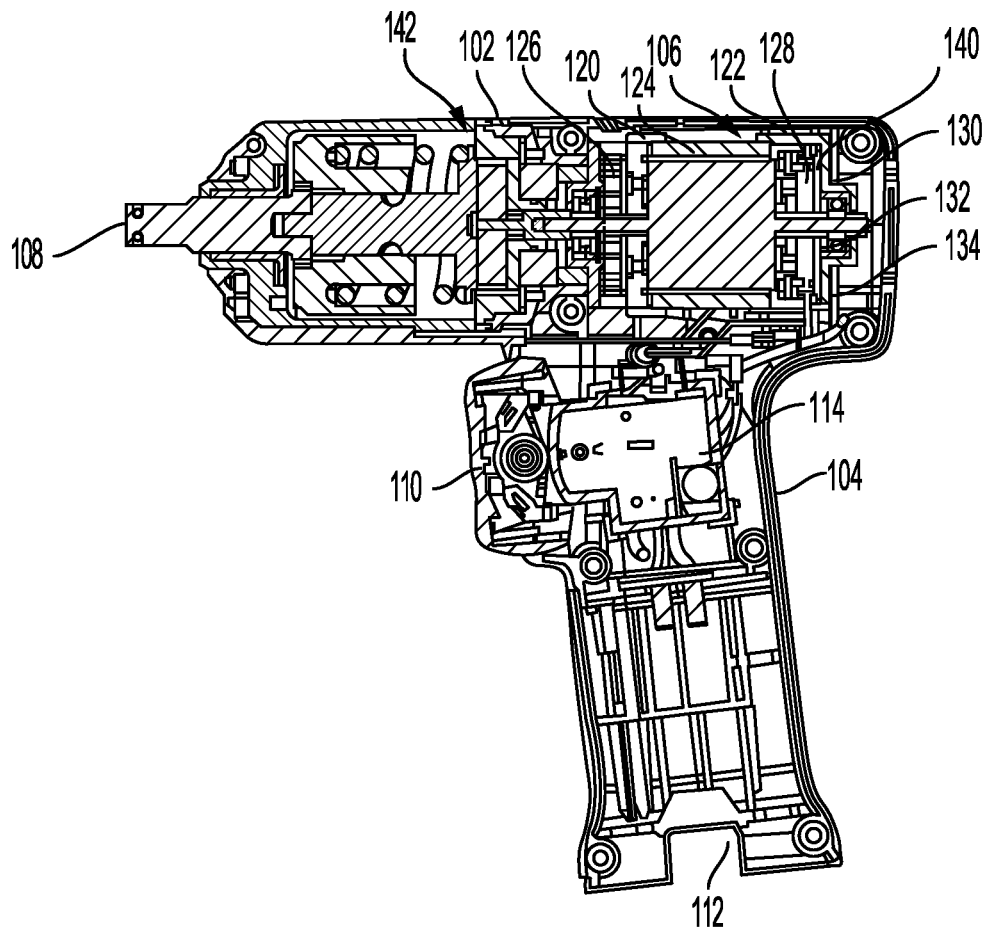
FIG. 2 is a cross-sectional view of the exemplar tool of FIG. 1.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a motor controller for a BLDC motor, such as that used with a power tool. The motor controller includes a control board and a power board. The power and control boards are coupled to a motor end cap. The power board is disposed on and coupled to an internal side or first side of the motor end cap. A thermal conductive pad is disposed between the power board and the motor end cap. The control board is disposed on and coupled to an external side or second opposing side of the motor end cap. The motor end cap is used as a heat sink to dissipate heat created during use of the motor and control boards, thereby eliminating the need for a separate heat sink. The present invention results in less components and simpler manufacturing, compared to current designs, and is able to be used in more compact power tools.

Referring to FIGS. 1-5, an exemplary tool 100 incorporating an embodiment of the present invention, such as, for example, a drill is depicted. However, it will be appreciated that the present invention is not limited as such and can be implemented in not only other power tools, such as, for example, impact wrenches, power screwdrivers, power ratchets, impact drivers, etc., but in other devices that include an electric motor (for example, a kitchen appliance). In an embodiment, the tool 100 includes a housing 102 assembled from first and second clamshell housing portions that are coupled together to cooperatively form the housing 102 in a well-known manner. The housing 102 includes a handle portion 104 that is adapted to be gripped by a user. The housing encloses a motor 106, gear assembly 142, and other additional components for operation of the tool 100. The tool 100 includes an output drive 108 coupled or engaged with the gear assembly 142, and the gear assembly 142 is adapted to receive and transfer torque from the motor 106 to the output drive 108. The output drive 108 is adapted to couple with a suitable tool, such as a socket, tool bit, or the like, for interfacing with a fastener or the like, to which torque is to be applied, all in a known manner.

A trigger 110 for controlling operation of the motor 106 is disposed on the handle portion 104. Depression of the trigger 110 causes power to be delivered to the motor 106, and hence rotation of the motor 106 selectively in either one of first and second rotational output directions (e.g., clockwise and counterclockwise), thereby selectively driving the output drive 108 in either one of first and second directions via the gear assembly 142. The trigger 110 can be biased such that a user can depress the trigger 110 inwardly, relative to the tool 100, which is detected by a trigger switch 114, using known methods, to cause the motor 106 to operate, and release the trigger 110, where the biased nature of the trigger 110 causes the trigger 110 to bias outwardly, relative to the tool 100, which is detected by the trigger switch 114, to cease operation of the motor 106. The trigger switch 114 is disposed in the handle portion 104.

In an embodiment, the trigger 110 can be a position sensitive trigger or variable speed trigger that also operates the motor 106 at varying speeds. For example, the further the trigger 110 is depressed, the faster the motor 106 operates. The rotational output direction of the motor 106, and, consequently, the output drive 108, is selectively controlled by a direction selector 116 in a known manner. The direction selector 116 can be, for example, a lever or knob.

In an embodiment, the tool 100 is powered by a battery (not shown), which may be removably coupled at a battery interface 112 of the handle portion 104. In an embodiment, the battery can be rechargeable. However, the present invention is not limited to battery powered tools and can be implemented in tools receiving power from other power sources, such as, for example, external power via a cord.

Figure 3:
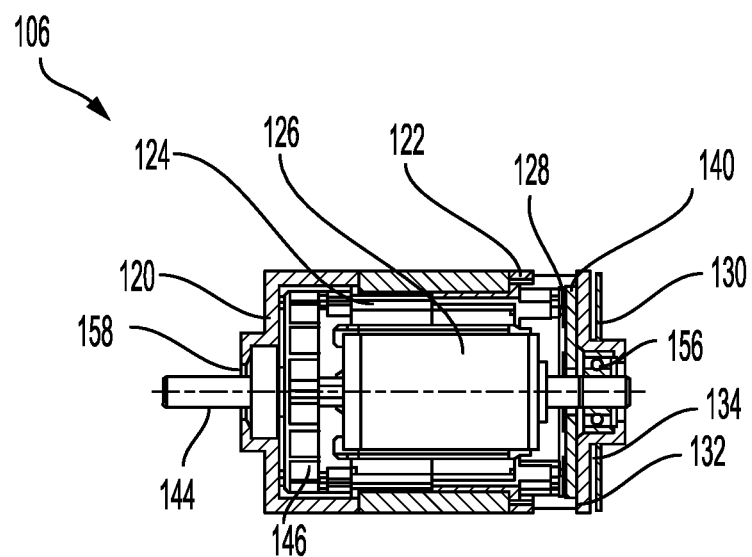
FIG. 3 is a cross-sectional view of an exemplar motor of the tool of FIG. 1.
Figure 4:
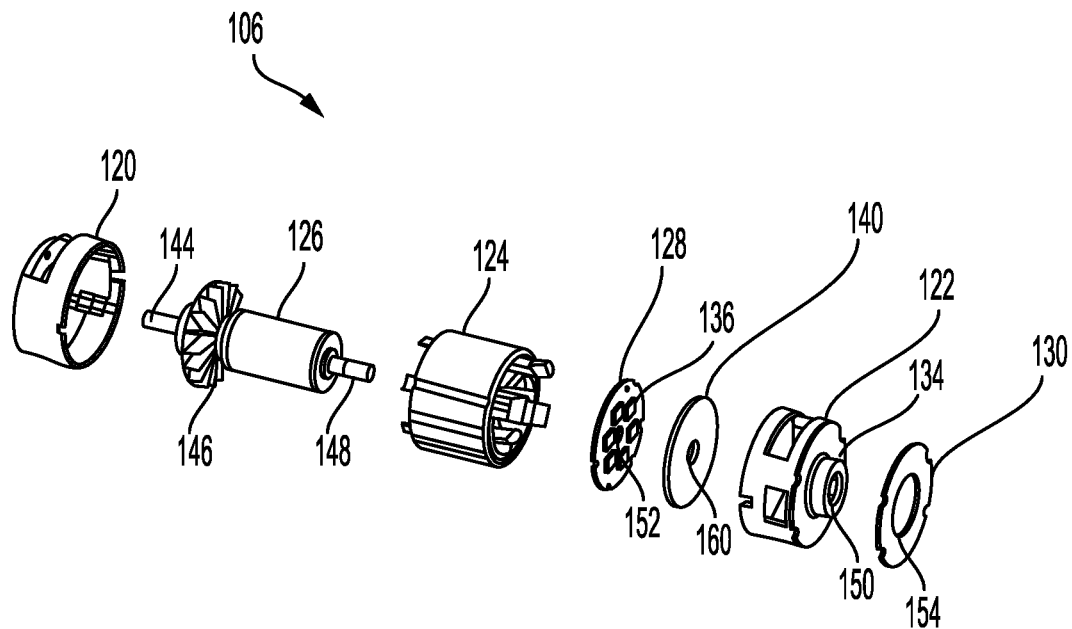
FIG. 4 is a perspective, exploded view of the motor of FIG. 3.
Figure 5:
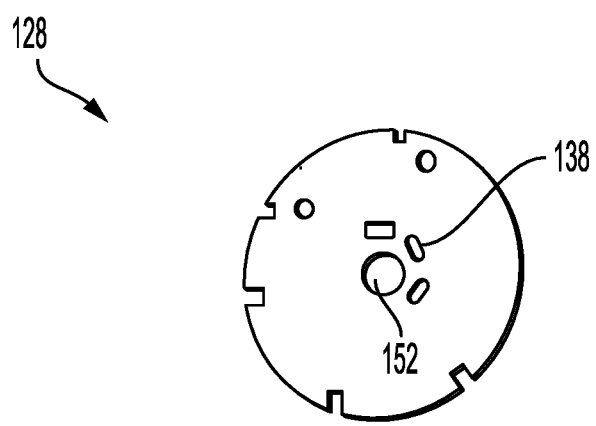
FIG. 5 is a side view of an exemplar power board of the motor of FIG. 3.

Referring to FIGS. 3-5, the motor 106 includes first 120 and second 122 end caps, a stator 124, a rotor 126, and a motor controller including power 128 and control 130 boards. The first 120 and second 122 end caps are adapted to be coupled to opposing ends of the stator 124, thereby enclosing the rotor 126 and power board 128. The first end cap 120 is disposed between the stator 124 and the gear assembly 142 and/or faces in a direction of the gear assembly 142 when the first end cap 120 is coupled to the stator 124. The second end cap 122 includes first 132 (also referred to as an internal surface) and second 134 (also referred to as an external surface) surfaces, wherein the first surface 132 faces an interior of the motor 106, and the second surface 134 is on an exterior of the motor 106. In an embodiment, the second end cap 122 is composed of a metal material, such as, for example, one or more of aluminum, magnesium, and carbon steel. The second end cap 122 thus functions as a structural support for the stator 124 and the rotor 126 while also functioning as a heat sink to reduce the temperatures of the power 128 and control 130 boards. In an embodiment, the motor 106 is a brushless DC electric motor (BLDC) that is controlled via commutation.

The rotor 126 includes an output shaft 144 that extends through an opening 158 in the first end cap 120 and is adapted to engage the gear assembly 142. In an embodiment, the opening 158 of the first end cap 120 includes a first bearing (not shown) that the output shaft 144 extends through to facilitate rotation of the output shaft 144 with respect to the first end cap 120. In an embodiment, the second end cap 122 includes an opening 150 having a second bearing 156 that receives a rear portion 148 of the rotor 126 to facilitate rotation of the rotor 126 with respect to the second end cap 122.

The gear assembly 142 receives torque from the output shaft 144 and transfers torque from the output shaft 144 to the output drive 108. The rotor 126 can also include rotor vanes or fins 146 that act as a heat exchanger and/or facilitate air flow through the motor 106 for cooling the motor 106. As illustrated, the rotor vanes or fins 146 are enclosed by the first end cap 120 when the first end cap 120 is coupled to the stator 124.

In an embodiment, the power board 128 is coupled to the first surface 132 (also referred to as an internal surface) of the second end cap 122 using, for example, fasteners, adhesives, etc., thereby being disposed inside the motor 106. The power board 128 may be a printed circuit board (PCB), and be electrically coupled to the stator 124. In an embodiment, the power board may also have a cross-sectional shape that corresponds with a motor shape, such as for example, circular, square, rectangular, etc.

The power board 128 includes first and second opposing sides. The first side of the power board 128 faces in a direction towards the stator 124 (away from the first surface 132), and the second side faces in a direction towards the first surface 132 of second end cap 122. The first side of the power board 128 includes one or more position sensors 138, such as, for example, Hall-effect sensors, that detect a rotational position of a permanent magnet of the rotor 126 relative to the stator 124. In an embodiment, the motor 106 is a three-phase BLDC motor, and the power board 128 includes three position sensors 138. The second side of the power board 128 includes one or more switching elements 136 that are adapted to selectively provide power from the power source (e.g., a battery) to the stator 124. The switching elements 136 include a high-side and low-side switching element. In an embodiment, the switching elements are metal-oxide semiconductor field-effect transistors (MOSFETs). In an embodiment, the motor 106 is a three-phase BLDC motor, and the power board 128 includes six switching elements 136 (e.g., a high and low side switching element for each phase). In an embodiment, the power board 128 includes an opening 152 adapted to allow the rear portion 148 of the rotor 126 to extend therethrough.

The control board 130 is coupled to the second surface 134 (also referred to as an external surface) of the second end cap 122 using, for example, fasteners, adhesives, etc. The control board 130 may be a printed circuit board (PCB), and be electrically coupled to one or more of the power source and the power board 128. In an embodiment, the control board 130 includes an opening 154 adapted to allow the rear portion 148 of the rotor 126 to extend therethrough. In an embodiment, the control board 130 includes a processor, such as, for example, a microcontroller or microprocessor device, for processing data and computer-readable instructions, and a memory for storing data and instructions. The memory may include volatile random access memory (RAM), non-volatile read only memory (ROM), and/or other types of memory. A data storage component may also be included, for storing data and controller/processor-executable instructions (for example, instructions for the operation and functioning of the tool 100). The data storage component may include one-or-more types of non-volatile solid-state storage, such as flash memory, read-only memory (ROM), magnetoresistive RAM (MRAM), ferroelectric RAM (FRAM), phase-change memory, etc.

Computer instructions for operating the tool 100 and its various components may be executed by the control board 130, using the memory as temporary "working" storage at runtime. The computer instructions may be stored in a non-transitory manner in non-volatile memory, storage, or an external device. Alternatively, some of the executable instructions may be embedded in hardware or firmware in addition to or instead of in software.

In operation, a position of the rotor 126 relative to the stator 124 can be determined using signals received from position sensors 138 using known methods. The switching elements 136 are selectively actuated to supply power from the power source (e.g., a battery) to the stator 124 to achieve a desired commutation based on a position of the rotor 126 relative to the stator 124. By selectively actuating the switching elements 136, the motor 106 is operated by sending a current signal through coils located on the stator 124. The coils cause a magnetic force to be applied to the rotor 126, which rotates the rotor 126 when current runs through the coils. The rotor 126 contains permanent magnets that interact with the magnetic forces created by windings of the stator 124. By activating successive combinations of high-side and low-side switching elements in a particular order based on the position of the rotor 126, thereby sending a particular order of current signals through the windings of the stator 124, the stator 124 creates a rotating magnetic field that interacts with the rotor 126 causing it to rotate and generate torque. The torque can then be applied to the gear assembly 142 and output drive 108.

A thermal interface material 140, such as, for example, a thermally conductive pad or thermal paste, may also disposed between the power board 128 and the first surface 132 (internal surface) of the second end cap 122. The thermal interface material 140 is adapted to assist in transferring heat away from the power board 128 and into the second endcap 122, which functions as a heatsink to dissipate heat created during use of the power 128 and control 130 boards. In an embodiment, the thermal interface material 140 includes an opening 160 adapted to allow the rear portion 148 of the rotor 126 to extend therethrough.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a housing, comprising:
 a motor disposed in the housing and adapted to receive power from a power source, wherein the motor includes:
  an end cap having opposing first and second surfaces;
  a power board coupled to the first surface and including opposing first and second sides, wherein the power board includes position sensors disposed on the first side and switching elements disposed on the second side; and
  a control board coupled to the second surface and including a processor.

2. The tool of claim 1, further comprising a thermal interface material disposed between the power board and the first surface.

3. The tool of claim 2, wherein the thermal interface material is one of a thermally conductive pad and thermal paste.

4. The tool of claim 1, further comprising a gear assembly disposed in the housing, and wherein the motor includes an output shaft that engages the gear assembly.

5. The tool of claim 1, wherein the end cap is composed of one or more of aluminum, magnesium, and carbon steel.

6. The tool of claim 1, wherein the first side of the power board faces in a direction away from the first surface of the end cap, and the first surface faces an interior of the motor.

7. The tool of claim 1, wherein the second side of the power board faces in a direction towards the first surface of the end cap, and the first surface faces an interior of the motor.

8. The tool of claim 1, wherein the switching elements are metal-oxide semiconductor field-effect transistors (MOSFETs), and the position sensors are Hall-effect sensors.

9. A motor controller for a motor having an end cap with opposing first and second surfaces, wherein the first surface faces an interior of the motor, the motor controller comprising:
 a power board adapted to couple to the first surface and including opposing first and second sides, wherein the power board includes position sensors disposed on the first side and switching elements disposed on the second side; and
 a control board adapted to couple to the second surface and including a processor.

10. The motor controller of claim 9, further comprising a thermal interface material disposed between the power board and the first surface.

11. The motor controller of claim 10, wherein the thermal interface material is one of a thermally conductive pad and thermal paste.

12. The motor controller of claim 9, wherein the first side of the power board is adapted to face in a direction away from the first surface of the end cap.

13. The motor controller of claim 9, wherein the switching elements are metal-oxide semiconductor field-effect transistors (MOSFETs), and the position sensors are Hall-effect sensors.

14. A motor adapted to be powered by a power source, the motor comprising:
 an end cap having opposing first and second surfaces, wherein the first surface faces an interior of the motor;

a power board coupled to the first surface and including opposing first and second sides, wherein the power board includes position sensors disposed on the first side and switching elements disposed on the second side; and a control board coupled to the second surface and including a processor.

15. The motor of claim 14, further comprising a thermal interface material disposed between the power board and the first surface.

16. The motor of claim 15, wherein the thermal interface material is one of a thermally conductive pad and thermal paste.

17. The motor of claim 14, wherein the motor is a brushless DC (BLDC) motor, and wherein the power source is a battery.

18. The motor of claim 14, wherein the end cap is composed of one aluminum, magnesium, and carbon steel.

19. The motor of claim 14, wherein each of the respective power and control boards is a printed circuit board (PCB), and wherein the switching elements are metal-oxide semiconductor field-effect transistors (MOSFETs), and the position sensors are Hall-effect sensors.

20. The motor of claim 14, further comprising a rotor and stator, wherein the end cap is coupled to the stator.

\* \* \* \* \*